US008620307B2

(12) United States Patent
Pöyhönen et al.

(10) Patent No.: US 8,620,307 B2
(45) Date of Patent: Dec. 31, 2013

(54) SELECTION OF ACCESS INTERFACE

(75) Inventors: Petteri Pöyhönen, Helsinki (FI); Janne Tuononen, Helsinki (FI); Ove Strandberg, Lappböle (FI); Haitao Tang, Helsinki (FI)

(73) Assignee: Nokia Corporation, Espoo (FI)

( * ) Notice: Subject to any disclaimer, the term of this patent is extended or adjusted under 35 U.S.C. 154(b) by 529 days.

(21) Appl. No.: 11/556,921

(22) Filed: Nov. 6, 2006

(65) Prior Publication Data
US 2007/0297378 A1    Dec. 27, 2007

(30) Foreign Application Priority Data
Jun. 21, 2006   (GB) .................................. 0612288.1

(51) Int. Cl.
H04W 4/00      (2009.01)
H04W 40/00     (2009.01)
H04M 1/00      (2006.01)

(52) U.S. Cl.
USPC ...... 455/432.1; 455/428; 455/445; 455/552.1

(58) Field of Classification Search
USPC ........... 455/412.2, 428, 432.1, 436, 437, 438, 455/439, 552.1, 553.1
See application file for complete search history.

(56) References Cited

U.S. PATENT DOCUMENTS

| 6,801,777 | B2* | 10/2004 | Rusch ........................ 455/452.2 |
| 7,564,824 | B2* | 7/2009 | O'Neill ........................ 370/338 |
| 2002/0015395 | A1* | 2/2002 | Karagiannis .................. 370/338 |
| 2003/0027554 | A1* | 2/2003 | Haumont ...................... 455/414 |
| 2004/0009751 | A1* | 1/2004 | Michaelis et al. .............. 455/62 |

(Continued)

FOREIGN PATENT DOCUMENTS

| KR | 2004051328 A | * | 6/2004 |
| WO | WO 03/047177 A1 | | 6/2003 |
| WO | WO2004/008693 A1 | | 1/2004 |
| WO | WO 2005/055524 | * | 6/2005 |
| WO | WO2005/055524 A1 | | 6/2005 |

OTHER PUBLICATIONS

International Search Report and the Written Opinion, PCT/IB2007/001591, dated Nov. 2, 2007.

(Continued)

*Primary Examiner* — Wesley Kim
(74) *Attorney, Agent, or Firm* — Alston & Bird LLP

(57) ABSTRACT

A method for automated selection of an access interface and a source address for communication between a communication device and a network node in a communication system, comprising: executing a first selection routine for considering at least one first policy on access interface allocation; and executing a second selection routine for considering at least one second policy on source address allocation; wherein at least one first output of the first selection routine is inputted into the second selection routine or at least one second output of the second selection routine is inputted into the first selection routine.

44 Claims, 6 Drawing Sheets

(56) References Cited

U.S. PATENT DOCUMENTS

| | | |
|---|---|---|
| 2004/0103204 A1 | 5/2004 | Yegin |
| 2004/0116140 A1 | 6/2004 | Babbar |
| 2004/0153455 A1* | 8/2004 | Bhogal et al. .................. 707/10 |
| 2005/0117546 A1* | 6/2005 | Lioy et al. ..................... 370/332 |
| 2006/0015513 A1 | 1/2006 | Poyhonen et al. |
| 2006/0025995 A1 | 2/2006 | Erhart et al. |
| 2006/0104262 A1* | 5/2006 | Kant et al. .................... 370/352 |
| 2006/0251044 A1* | 11/2006 | Haddad ......................... 370/349 |
| 2008/0130637 A1* | 6/2008 | Kant et al. .................... 370/389 |
| 2009/0080387 A1* | 3/2009 | Dell'Uomo et al. .......... 370/338 |

OTHER PUBLICATIONS

Camarillo, G. et al., "Hip Bone: Host Identity Protocol (HIP) Based Overlay Networking Environment", available at http://tools.ietf.org/html/draft-ietf-hip-bone-01, dated Jan. 21, 2010, 19 pages.

Ng, C. et al., "Analysis of Multihoming in Network Mobility Support", available at http://tools.ietf.org/id/draft-ietf-nemo-multihoming-issues-02.txt, dated Jan. 21, 2010, 34 pages.

European Search Report for Application No. 07 734 832.4, dated May 24, 2013.

International Preliminary Report on Patentability for Application No. PCT/IB2007/001591, dated Sep. 25, 2008.

\* cited by examiner

SELECTION OF ACCESS INTERFACE

FIELD

The present invention relates to the field of telecommunications systems, and in particular to methods and apparatus for the selection of an access interface and a source address for communication via a communications system.

BACKGROUND

A communications system is a facility which enables communication between two or more entities such as user terminal equipment (mobile or fixed) or other communication device, network entities and other nodes. The communication may comprise, for example, communication of voice, electronic mail (email), text messages, data, multimedia and so on.

An appropriate communications network provides a user with a access to the communications system. A communication device of the user may be capable of accessing a communications system by means of a plurality of different access networks, this requiring that the communication device is compatible with different access technologies.

A communications network typically operates in accordance with a given standard or with a given set of specifications which set out what the various elements of a system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the communication networks is typically based on a pre-defined communication protocol. In other words, a specific set of "rules" on which the communication can be based needs to be defined to enable the user equipment to communicate via the communications system.

An access interface may be provided by a fixed line or wireless communication interface. Communication systems providing wireless access enable at least some degree of mobility for the users thereof. More advanced mobility support can typically be added as an enhanced feature. An example of communication networks providing wireless access is a public land mobile network (PLMN), such as the second generation (2G) GSM (Global System for Mobile communications), the so called 2.5 generation GPRS (General Packet Radio Service) or the third generation (3G) WCDMA (Wideband Code Division Multiple Access) or EDGE (Enhanced Data for GSM Evolution). The public land mobile networks (PLMN) are commonly based on cellular technology.

In cellular systems, a base transceiver station (BTS) or similar access entity services mobile communication device or user equipment (UE) via a wireless interface between these entities. The communication on the wireless interface between the user equipment and elements of the communication network can be based on an appropriate communication protocol. The operation of the base station apparatus and other apparatus required for the communication can be controlled by one or several control entities. Other examples of wireless access technologies include various wireless local area networks (WLANs) and satellite based systems.

Examples of fixed line access technologies include public switched telephone networks (PSTN), cable networks, digital subscriber line (DSL) networks, and so on.

The various control entities of a communication system may be interconnected. One or more gateway nodes may be provided for connecting an access network to other communication networks, for example to an IP (Internet Protocol) and/or other packet switched data networks. In such arrangements, the communications network provides an access network enabling a user with appropriate user equipment to access external networks, hosts, or services offered by specific service providers.

In a packet data network, a packet data carrier or bearer may be established to carry traffic flows over the network. An example of such a packet data carrier is a packet data protocol (PDP) context in current GPRS, EGPRS and WCDMA networks.

Conventional mobile terminals may support only cellular access technology for data communication, and usage of data in those mobile terminals is relatively simple. For example, in response to a user launching a data application a pre-defined GSM data connection, a GSM based EDGE data connection, or a WCDMA data connection or similar may be created.

More sophisticated user equipments provided with multi-radio capabilities may access services provided via the communications system via a number of access network technologies. For example, a mobile device may connect to services provided via the communications system by setting up a PDP context on an EDGE network of a 3G access network, or by setting up a connection through a non-cellular complementary access system, for example a WLAN.

This means new opportunities for data transfer, for example for applications like Voice over the IP (VoIP). On the other hand, this also causes new challenges, for example, because of introduction of mobile applications that need to be processed by the cellular and non-cellular systems with changing characteristics for the access, for example the bitrate, cost, coverage and so on. For example, cellular coverage is typically provided nationally whereas WLAN coverage is only provided in small hot spots. Therefore cellular connectivity should work all the time but non-cellular systems, for example the WLAN, provide only temporary and local connectivity. Because of the different nature of the access systems substantially different features such as networking protocols and applications may be used by the different access technologies.

The number of increased access technologies, the temporary availability of some access technologies, for example the WLAN, and variety of applications with different requirements increase mobile terminal usage complexity and might lead to under-usage of network potential. For example, it may turn out to be laborious to try to activate a WLAN connection because a user might not know where a WLAN hotspot is available.

If decisions that relate to connectivity are not automated, usage of mobile terminals may become fairly complex, thus hindering utilization of the potential different connectivity technologies may offer. For example, a user may wish to use a WLAN access for email communication when there is no WLAN facility available. In such situation the user may stay on a GPRS (General Packet Radio Service) network for a considerable time, even for days, unless he/she continuously checks for the availability of a WLAN network or similar. If the connectivity decision is automated, the mobile communication device could automatically switch to a WLAN network after detection that such a network has become available.

However, if a mobile terminal is enabled to select an access technology automatically, then other problems may arise. This may be the case especially in association with protocols used in different networks to access services. For example, although a set of protocols might be enough when using a GPRS connection, another set of protocols might be needed when using a WLAN connection. If the WLAN access is provided by a WLAN network that does not offer enabled security features better security may be required on the IP level (like IPsec) to prevent evesdropping. An average user may have difficulties if he/she tries to manage all the required settings manually. Therefore it might be advantageous to have an improved mechanism for selection of an access interface.

As well as selecting an access interface, a terminal may need to select a source address for data packets to be transmitted according to a communications protocol. For instance, in certain circumstances, the terminal may be able to choose between sending packets via a home address as source address (reverse tunnelling via a home agent) or sending packets directly to a Correspondent Node (CN) using Care-of-Address (CoA) as source. Further selection options may be available where the terminal has a plurality of home addresses in use. Current protocols may be insufficient to deal with such situations.

SUMMARY

Embodiments of the present invention aim to address one or more of the above-mentioned problems associated with the prior art.

In accordance with an embodiment there is provided a method for automated selection of an access interface and a source address for a communication between a communication device and a network node in a communication system, comprising:

executing a first selection routine for considering at least one first policy on access interface allocation; and executing a second selection routine for considering at least one second policy on source address allocation; wherein at least one first output of the first selection routine is inputted into the second selection routine or at least one second output of the second selection routine is inputted into the first selection routine.

Another embodiment provides a communication device configured to automatically select an access interface and a source address for a communication between the communication device and a network node in a communication system, the communication device comprising:

a first controller entity for executing a first selection routine for considering at least one first policy on access interface allocation; and a second controller entity for executing a second selection routine for considering at least one second policy on source address allocation; wherein the communication device is configured to input at least one first output of the first selection routine into the second selection routine or to input at least one second output of the second selection routine into the first selection routine, and to select the access interface and source address based on the first and second outputs.

Another embodiment provides a network node configured to automatically select an access interface and a source address for a communication between the network node and a communication device in a communication system, the network node comprising:

a first controller entity for executing a first selection routine for considering at least one first policy on access interface allocation; and a second controller entity for executing a second selection routine for considering at least one second policy on source address allocation; wherein the network node is configured to input at least one first output of the first selection routine into the second selection routine or to input at least one second output of the second selection routine into the first selection routine.

Another embodiment provides a communication system comprising a communication device and network node, wherein the communication system is configured to automatically select an access interface and a source address for a communication between the communication device and the network node, the communication system further comprising:

a first controller entity for executing a first selection routine for considering at least one first policy on access interface allocation; and a second controller entity for executing a second selection routine for considering at least one second policy on source address allocation; wherein the communication system is configured to input at least one first output of the first selection routine into the second selection routine or to input at least one second output of the second selection routine into the first selection routine.

Embodiments of the present invention advantageously provide a cooperative approach to source address and network access selection. By using outputs of an access interface selection routine as input parameters in a source address selection routine or vice versa, source address and network access selection can be combined to select the most appropriate source address and access interface for all circumstances. The method also supports dynamic and plug & play selection logic and selection rule management, leading to an improved user experience.

BRIEF DESCRIPTION OF THE DRAWINGS

For a better understanding of the present invention and how the same may be carried into effect, reference will now be made by way of example only to the accompanying drawings in which.

DETAILED DESCRIPTION

To assist in understanding the invention, an explanation of a possible underlying communication system is given first with reference to a mobile terminal 1 operating in a personal area network (PAN) 2. The mobile terminal may be capable of connecting to a General Packet Radio System (GPRS) 3 or to a Wireless Local Area Network (WLAN) system 4.

It is noted that although certain embodiments will now be described by way of example, with reference to the exemplifying architectures of a cellular communication system comprising at least a GPRS mobile communication network and of a wireless local area network, embodiments may be applied to any other suitable forms of communication systems than those illustrated and described herein. It is also noted that in the description below the term interface is understood to refer to an access technology. For example, the available interfaces may be based on access technologies such as GSM, 3GPP, EDGE, WCDMA, CDMA, WLAN, UWB (Ultra Wide Band), or short range links such as the Bluetooth™ (a short range radio link), WiMax (Worldwide Interoperability for Microwave Access), or the Rfid (radio frequency identification; an infrared link) and so forth.

A mobile device 1 may use various applications based on appropriate protocols, for example the mobile IP protocol. The applications may be provided, for example, by means of an IP based data network system such as the Internet 5. The mobile terminal may use a home agent 6 as a source address for an IP communication.

Figure 1:
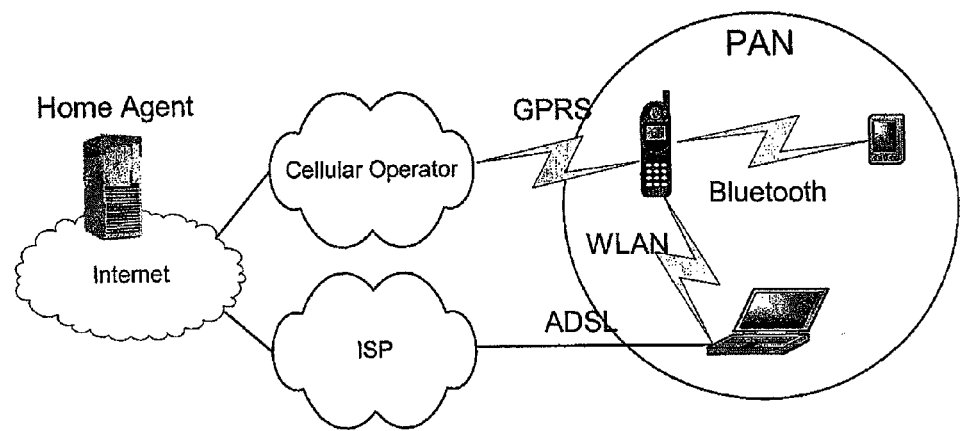
FIG. 1 shows a schematic view of a communications system comprising a plurality of networks including a personal area network (PAN)

A cellular mobile communication system 7 is typically arranged to serve a plurality of mobile user equipment, via a wireless interface between the user equipment and base stations of the communication system. In FIG. 1, a number of elements of mobile communication network 7 are omitted for the sake of clarity. The cellular communication network provides packet switched data transmission in the packet switched domain between a support node and the mobile device 1. The network 7 in turn is connected to external data networks, for example the Internet 5, via a gateway GPRS support node (GGSN).

The GPRS service allows transmission of packet data between mobile communication devices and external data networks. In addition to at least one gateway, a 3G network typically comprises also a number of packet data service nodes (SN). In the shown embodiment, the service node may be provided by a serving GPRS support nodes (SGSN). Each SGSN may be connected to at least one mobile access network, typically to a base station system. The base station is arranged to transmit signals to and receive signals from the mobile device 1, via respective wireless interfaces. Correspondingly, each mobile device is able to transmit signals to and receive signals from the base stations via the wireless interface.

A mobile device within a radio access network may communicate with a radio network controller via radio network channels which are typically referred to as radio bearers. Each mobile device such as a mobile user equipment may have one or more radio channels open at any one time with the radio network controller. For example, a user may access the cellular network by means of communication devices such as a personal computer, personal data assistant (PDA), mobile station (MS), portable computer, combinations thereof or the like.

The mobile device can be used for various tasks such as making and receiving phone calls, for receiving and sending data from and to a network and for experiencing, for example, multimedia or other content. The communication device is typically provided with a processor and memory for accomplishing these tasks. The operation of the user equipment may be controlled by means of a suitable user interface such as key pad, voice commands, touch sensitive screen or pad, combinations thereof or the like.

Overall communication between user equipment in an access entity and the GGSN of a cellular network can be provided by a PDP (packet data protocol) context. Each PDP context provides a communication pathway between a particular user equipment and a GGSN. Each PDP context identifies the characteristics of data to be transferred, for example quality of service (QoS), to be transferred in the PDP context. Once the PDP context is established, it can typically carry multiple flows having similar enough data transfer characteristics. Each flow normally represents, for example, a particular service and/or media component of a particular service. The PDP context therefore often represents a logical communication pathway for one or more flows across the cellular network. To implement the PDP context between user equipment and the serving GPRS support node, radio access bearers need to be established which commonly allow for data transfer for the user equipment. A user equipment may have one or more active PDP contexts at a time.

FIG. 1 shows also a WLAN network 4. In addition to a PDP context provided by GPRS 3 and network 7, the mobile device 1 may access the communication system via the WLAN 4. The WLAN is an example of an access technology that provides radio access to another system, for example an IP network provided by an internet service provider 8, another device and so forth. It is noted that no IP based communications is necessarily required but some other protocol may be used instead. Each WLAN is provided with at least one access point (for example a laptop computer 9) and a packet data gateway in the internet service provider 8.

The data carrier can be provided by means of a number of protocols. For example, when accessing an IP network and services provided in the IP network, the IP protocol is used to carry data, UpnP (Universal plug and play) may be used to discover devices and services, and so on. IP security may be enhanced by using a so called IPsec tunnel. Internet Key Exchange (IKEv2) signalling may be used to negotiate and manage IPsec tunnels between the mobile device 1 and the packet data gateway. The packet data gateway may connect the WLAN to internet network 5.

Figure 2:
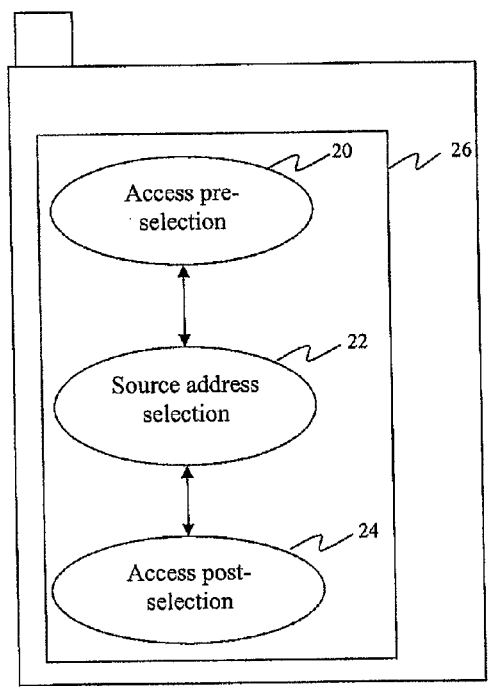
FIG. 2 shows selection entities in a mobile device according to one embodiment.

Turning now to embodiments wherein an appropriate interface is selected, a reference is first made to FIG. 2 showing an embodiment wherein automated connectivity decisions are made in a mobile device by means of separated selection processes. Each one of the selection processes is executed in a respective selection entity. Each of the selection entities is adapted to execute a routine that considers at least one predefined policy directed to particular aspects of the available access interfaces and source addresses.

More particularly, FIG. 2 shows a first access policy entity 20, a second access policy entity 24 and a source address selection policy entity 22. Each of these entities of the mobile device may be located in its own respective module. Selection of a suitable communication interface can then be based on information collected from each of these modules.

As shown by the double headed arrows, the modules 20, 22 and 24 are connected to each other and may interact during the decision-making process.

It is noted that the functionalities of the policy controlling entities may be combined into one or two modules or distributed across several modules. In the embodiment shown, the first and second access policy entities are located in an access manager 26.

The access technology, e.g. communication interface, selection may be based on a predefined policy or policies that are directed to considering the communication protocols and services that lie behind the available access technologies. An appropriate access selection policy narrows down the list of possible access technologies that allow connection to a desired service. The final access technology selection can then be made based on mobile device system information and user preferences.

The access technology selection may also be based on a predefined access selection policy or policies directed in considering the communication requirements of a flow. An appropriate access selection policy may receive flow requirements from an application. The requirements may also be obtained from networking protocols. For example, the IP Diffserv can be used to reveal required priority information, QoS information and so on. Flow requirements may also be decided based on flow information, like used source or destination port number. For example, a FTP service may be decided based on TCP port number, the FTP characteristics (which may be non-real-time, high bit-rate, reliable, delay-tolerant, and so on), or by investigating used protocols (RTP header means delay sensitive traffic). The final access technology selection can then be made based on flow requirements.

Different functional decision levels can be introduced in the control software of the mobile device to automate the connectivity decisions. The purpose of the different decision levels is to perform the decision-making process in functional locations that have enough and detailed information readily available for the decision-making. An access selection policy may know, for example, IP level flow, protocol and service information. An access policy is not necessarily capable of handling IP protocols, but it may be able to handle, for example, the EDGE PDP context logic. Therefore in some embodiments access selection policy is executed on the IP level (layer 3 or L3) rather than at the EDGE (layer 2, L2 or access) level. Thus the term "locations" can be understood to mean that a certain policy functionality is located such that it can interwork with a certain system functionality. A levelled decision making process may also assist in keeping the design modular.

A process for selecting an access technology can be based on detecting available interfaces, detecting if a virtual private network (VPN), a mobile IP (MIP) network or any other required protocol or service is available, and checking mobility policy settings. The bearer switching may then be done "seamlessly" with the help of the MIP or VPN. Seamless handovers are enabled between systems by the MIP because applications on the mobile device can use the same IP address regardless of the interface used. A VPN may be considered by the selection process to provide seamless operation such that, for example, decreased radio security is compensated appropriately by VPN, and therefore satisfies the criteria. If no MIP or mobility enabled VPN is available, so called "hard roaming" may occur. An example of hard roaming is when a mobile device activates a WLAN connection and moves flow from a EDGE connection to the WLAN connection, this resulting in a change of the IP address. The application has then to establish a new TCP connection because of the changed IP address, since otherwise data cannot be transferred, or the application may stop working because of the changed IP address.

The first access policy entity 20 in the access manager 26 may perform a first access selection routine for network access pre-selection. In one embodiment, the first access policy entity may comprise three sub-modules, i.e., a layer 2 (L2) access advertising function, a L2 access discovery function, and a L2 access selection function. Typically the first access policy entity of the access manager has sufficient information to make a standalone access selection decision without external communication. However in some embodiments, it may be necessary for the access manager to contact an external entity to retrieve additional information to be able to make this decision.

As shown in a PAN case example in FIG. 1, the L2 access advertising function in each node advertises its available accesses to its connected neighbours and the neighbours forward this advertisement further to their connected neighbours, if they have any. The advertising message can provide the information shown in e.g., Table 1. The L2 access discovery function in each node then extracts and constructs a complete physical L2 network, showing how the node is connected, from the advertisements. The constructed physical L2 network can be for example as shown in Table 2, Table 3, and Table 4.

TABLE 1

Content of an advertising message from mobile phone.

|  | RA1 | RA2 | RA3 |
|---|---|---|---|
| Access Type | GPRS | Bluetooth | WLAN |
| Access Cost | High | Low | Low |
| Access Speed | Low | Medium | VeryHigh |
| Access QoS | BestEffort | BestEffort | BestEffort |
| Device Role |  | Router & Terminal |  |
| Device Name |  | Phone_ABC |  |

TABLE 2

Physical network topology.

|  | Phone_ABC | PDA_ABC | Laptop_ABC | Operator | ISP |
|---|---|---|---|---|---|
| Phone_ABC | Local | Bluetooth | WLAN | GPRS |  |
| PDA_ABC | Bluetooth | Local |  |  |  |
| Laptop_ABC | WLAN |  | Local |  | ADSL_ul |
| Operator | GPRS |  |  | Local |  |
| ISP |  |  | ADSL_dl |  | Local |

TABLE 3

Information of the physical links.

|  | Cost | Speed | QoS | Connection between Peer |
|---|---|---|---|---|
| GPRS | High | Low | BestEffort | Ready |
| Bluetooth | Low | Medium | BestEffort | Ready |
| WLAN | Low | Very High | BestEffort | Ready |
| ADSL_ul | Low | Medium | BestEffort | Ready |
| ADSL_dl | Low | High | BestEffort | Ready |

TABLE 4

Devices information.

|  | Network Role | Routing Permission Granted to |
|---|---|---|
| Phone_ABC | Router & Terminal | PAN |
| PDA_ABC | Terminal |  |
| Laptop_ABC | Router & Terminal | PAN |
| Operator | Router | Phone_ABC |
| ISP | Router | Laptop_ABC |

TABLE 5

The available set of access seen by Phone_ABC.

| Source | Immediate RA | Destination | Cost |
|---|---|---|---|
| Phone_ABC | Local | Phone_ABC | 0 |
| Phone_ABC | Bluetooth | PDA_ABC | Low |
| Phone_ABC | GPRS | Operator | High |
| Phone_ABC | WLAN | Laptop_ABC | Low |
| Phone_ABC | WLAN | ISP | Low |

The L2 access selection function in each node then selects the available set of L2 accesses for its upper layer in the same node according to various selection rules. For example, the L2 access selection function in the phone shown in FIG. 1 can select the accesses for the upper layer as what is shown in Table 5. In this case, the upper layer in the phone has selected an available set of five accesses (namely, the phone itself, the PDA, the operator, the laptop, and the ISP). Each of the selected accesses has certain cost(s) associated. The upper layer then makes its further selection partly based on the cost(s) provided.

Whenever any L2 access changes happen in any node in the L2 network, the three functions in each node will be activated again to select a new set of L2 accesses for its node according to the change. The first access policy entity in the access manager then reports this new set of available L2 accesses to the upper layers. The set change may be provoked by, for example, a node detecting that a new L2 access network has become available or that an existing L2 access has just been lost. For example, a power-on event in a node or node mobility in the physical world can often provoke the appearance or loss of an L2 access network as perceived by a node.

The intelligent source address selection entity (22) in the upper layer may direct further to the access manager 26 in L2 with more specific requirements. For example, in case of Table 5, the selection entity 22 in the upper layer may specify "access to a router with lowest possible cost" to the access manager in L2. The access manager in L2 will then use only the ISP access for the actual traffic even if the ISP and the operator are actually under the same L3 administrative domain. If the access manager cannot meet the further requirement given by the intelligent source address selection, the access manager simply reports a failure to the intelligent source address selection.

Figure 3:
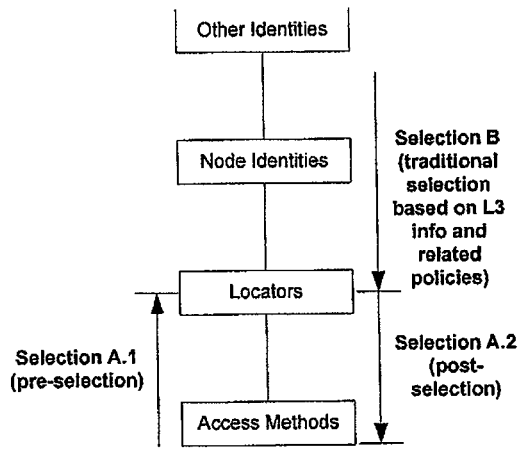
FIG. 3 shows various approaches to access network selection.

FIG. 3 depicts an example set of different identities involved in name resolution and source address and access selection processes. Arrow B (intelligent source address method) represents an approach to selection of a source address based on IP-layer (L3) information and how an access interface is then implicitly selected based on the results of selection B.

A standard IP source address selection logic defined by IETF is considered to be a part of selection B. However, this is not feasible in all cases because independently of the attached/configured addresses (locators), not all access types are suitable for all kind of traffic (for example real-time traffic). In addition, considering that mobile nodes typically have limited resources such as power, it is important to take into account these type of factors while selecting a source address and access technology.

Arrow A.1 (network access pre-selection) represents this type of pre-selection phase, in which a selection is performed based on available access type characteristics and local information like user preferences, policies and configuration. The results are then used as additional input parameters for selection B. After selection B has made a decision, a network access post-selection might be required (selection A.2 in the figure). So the whole selection process looks like: [Selection A.1]+Selection B+[Selection A.2]. Selection A.1 and/or selection A.2 may optionally be performed with selection B. It should be noted that also other external functionalities might be involved depending on the use scenario, configuration and implementation.

Figure 4:
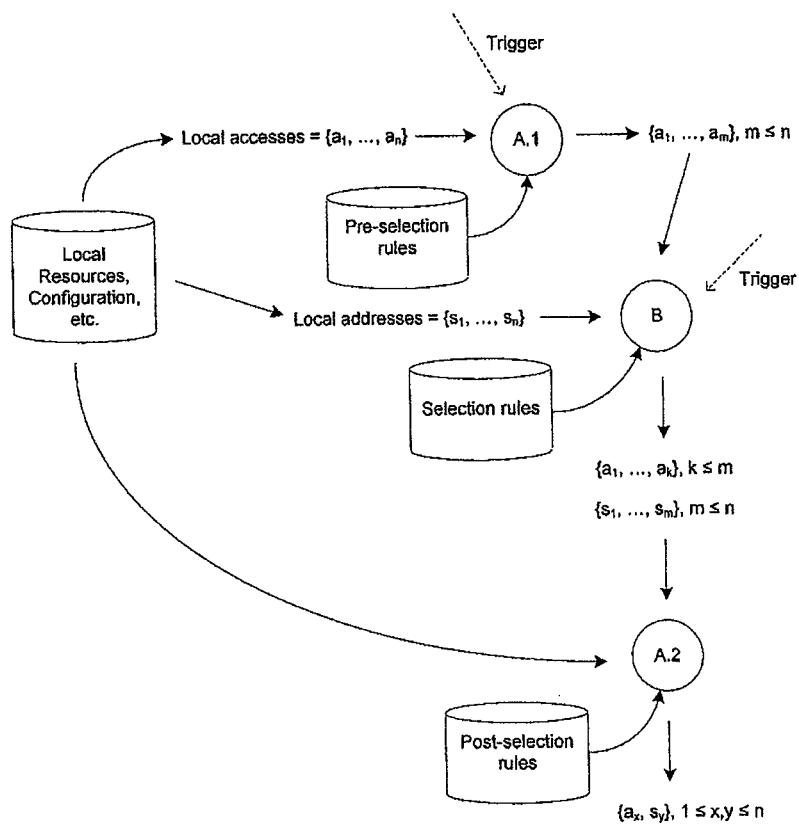
FIG. 4 shows various phases of an access network and source address selection routine.

FIG. 4 illustrates the ordering of these three methods; network access pre-selection (A.1), intelligent source address method (B) and (network access post-selection) A.2. As we can see, the selection process could be triggered to start from either A.1 or B. Also, it should be noted, that under certain circumstances, it is possible that A.1 is executed without any further steps; i.e. B and A.2. The A.1 step typically uses local information as input and then produces a set of parameters for B as input.

The B step uses as input information provided by A.1 and local information. Step B proceeds with access and source address selection and provides a set of parameters for A.2 as input. The A.2 step is optional and if it is needed, it continues the selection process based on information provided by B and local information and produces a final set of parameters. Typically this is a source address and access pair that is consistent with the current rules, policies, configuration and user preferences.

Figure 5:
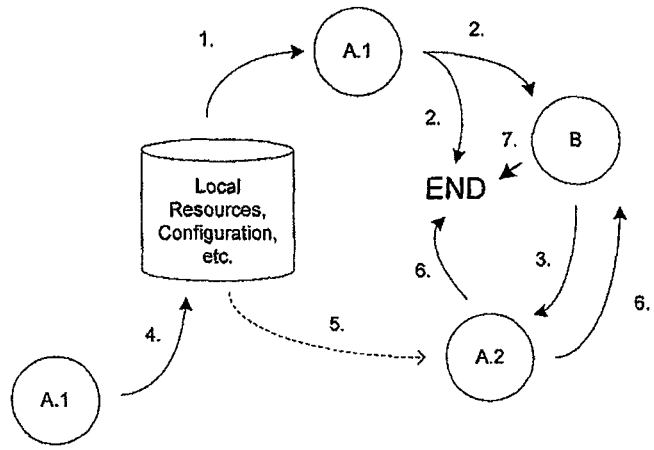
FIG. 5 is a schematic illustration of a sequence of steps in an access network and source address selection method.

FIG. 5 represents how the selection process starts (1.) with A.1 and then it ends under certain circumstances (2.) or B is called (2.). B calls A.2 (3.) and after this A.1 may update local information (4.) and possibly these changes may invalidate the results of B. B calls A.2 (5.) that is checking local information and either accepting an input provided by B and finishing the selection process (6.) or if local information is not compatible with the input, then A.2 may inform B about this (6.) and B then ends the process (7.).

Figure 6:
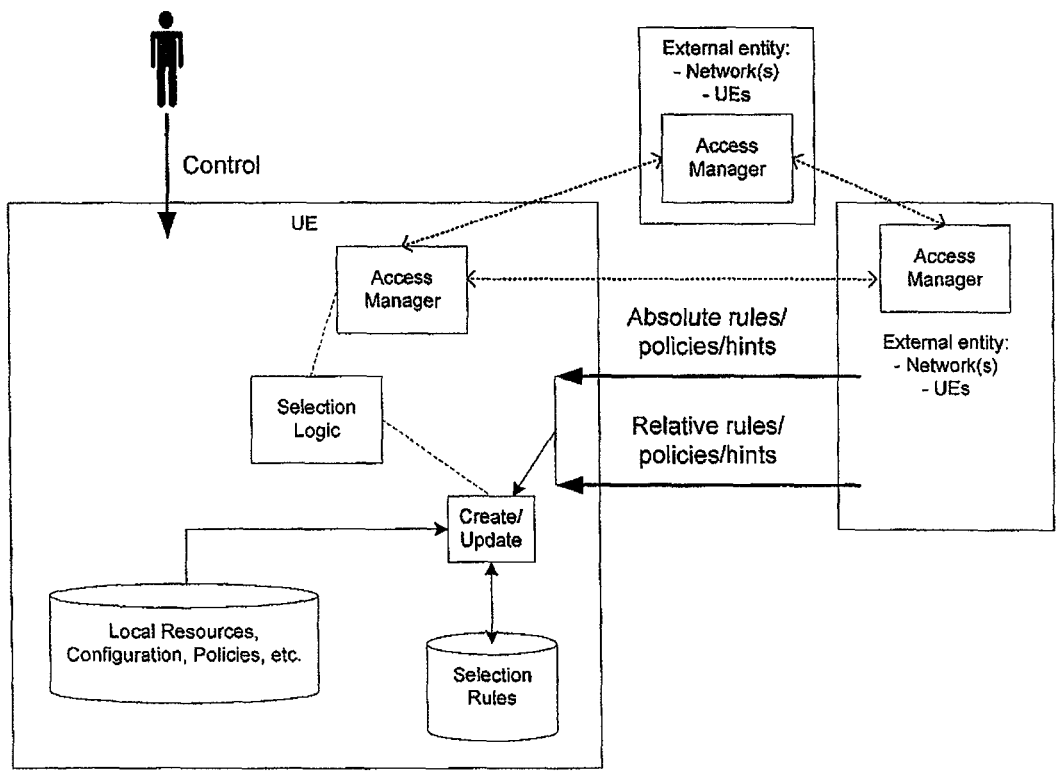
FIG. 6 shows a procedure for selection rule management.
Figure 7:
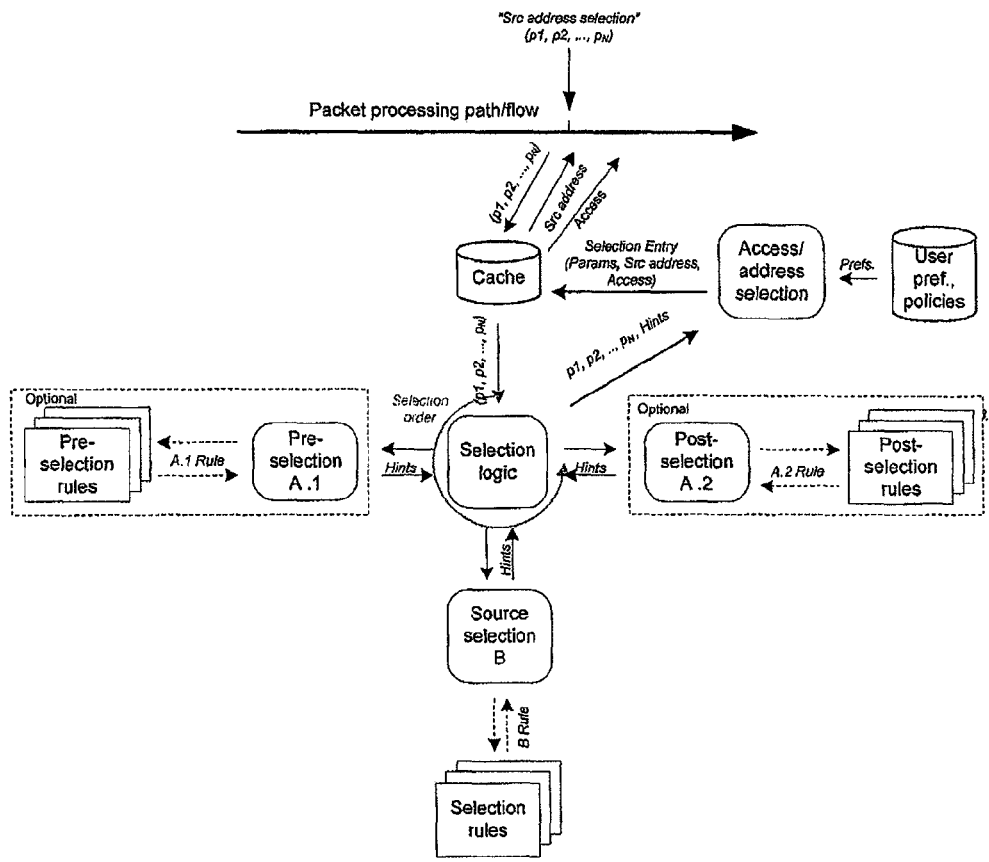
FIG. 7 shows an overview of runtime source address and access selection logic.
Figure 8:
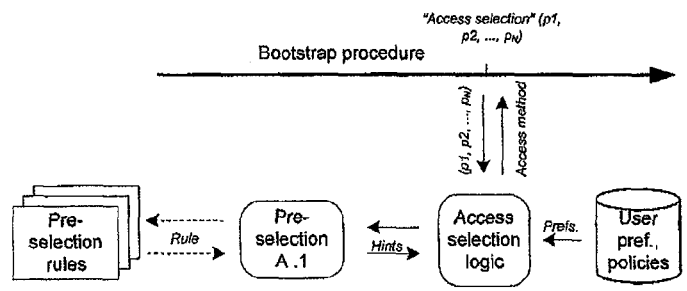
FIG. 8 shows an overview of selection logic during a bootstrap procedure.

FIG. 6 illustrates what kind of information is involved in the creation and maintenance of selection rules. The information derived from the network side can be divided into to different categories; absolute information and relative information. Absolute information includes all information that is the same for each node and relative information includes information that requires processing in each node resulting from different kinds of rules depending on local resources, etc. The user also has control to this process and in some cases human intervention might be preferred or even required. Access managers both in the network side providing rules and other information for the selection purposes and terminals may communicate with each other to exchange state information like network capabilities, load levels of supported RATs, etc. This state information may be then used to further create or modify the selection rules and hints and other policies.

For selection A.1, A.2 and B different types of selection rules are required. Tables 1 and 2 illustrate generic rules for both types and some examples for criteria and hints in each case.

TABLE 1

Pre-Selection Rules (A.1)

| Pre-Selection Criteria | Pre-Selection Hint |
|---|---|
| User Profile<br>Local Configuration/Policies<br>Symbolic name<br>"service" | Interface type/ID/name/group<br>Access requirements (e.g. bit rate, mobility support, interworking support etc.) |

TABLE 2

Selection Rules (B)

| Source Address Selection Criteria | Source Address Selection Hint |
|---|---|
| IP address:<br>dst address<br>gateway address<br>proxy address<br>etc. | IP address(es), IP prefix(es) |
| IP prefix<br>Identity:<br>Host Identity<br>Certificate<br>etc. | IP address(es), IP prefix(es)<br>IP address(es), IP prefix(es) |
| Symbolic name<br>FQDN<br>"service"<br>etc. | IP address(es), IP prefix(es) |
| Default<br>etc. | IP address(es), IP prefix(es) |

Figure 9:
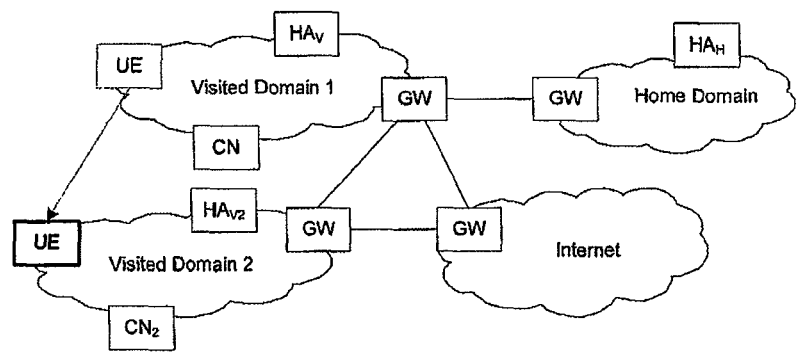
FIG. 9 shows an example illustrating how selection rules may be updated according to a movement of a terminal.
Figure 9:
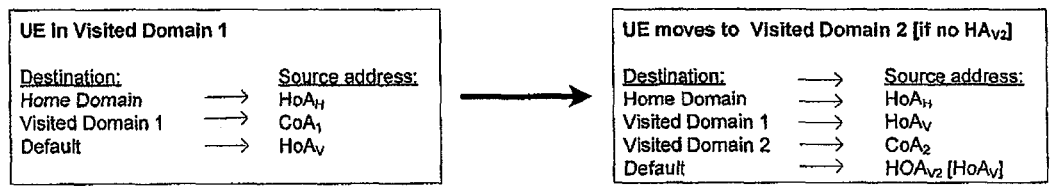

After a node has adapted selection rules to the local resources and current environment they can be used in the selection logic procedure. However possible changes in local resources or the environment may require re-adaptation of the rules. FIG. 9 represents an example of how selection rules change when a mobile terminal supporting MIPv6 is moving from a visited network to another network.

In FIG. 9 re-adaption of selection rules has been illustrated in the case when MIPv6 is supported and the UE moves from one visited network to another—so in practice which IP address the UE chooses as a source address for IP packets when sending them to different domains and how this selection is affected by the movement. FIG. 9 includes two alternative scenarios (with or without local home agent in the current visited domain).

We can conclude that when the visited domain changes, selection rules for all domains, except the home domain, change as follows:
1. Source address selection rule re-adaptation for Visited Domain 1: src address: $CoA_1 \rightarrow HoA_V$
2. Source address selection rule re-adaption for Visited Domain 2: src address : $CoA_2$
3. Source address selection rule re-adaption for "Default": src address: $HoA_V \rightarrow HoA_{V2}$ (or $HoA_V$ if $HoA_{V2}$ doesn't exist)

In further embodiments, the present invention provides methods for distributing relative and absolute selection rules that are stored in the network to nodes. Three examples of methods for performing this distribution by adapting existing network services are given below.

Figure 10:
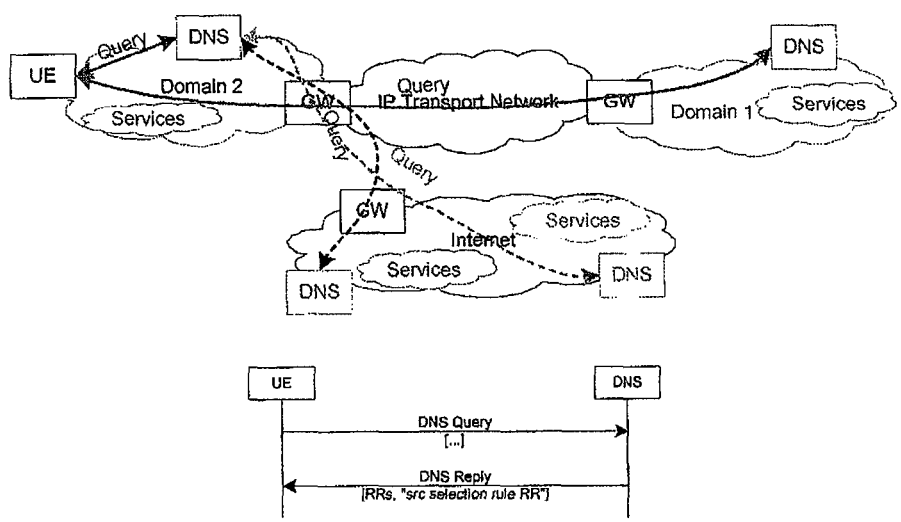
FIG. 10 shows an example illustrating how name resolution infrastructure such as DNS can be used to distribute selection rules.

FIG. 10 illustrates an embodiment wherein name resolution infrastructure, namely DNS (Domain Name Service), is used to implement the distribution. This method requires definition of a new resource record type that carries the selection rule in DNS response message.

The functionality illustrated in FIG. 10 is a DNS query-reply. The non-standard part in this embodiment is that (as mentioned above) a new resource record type will be needed to carry selection rule information. This new resource record may also require a new query type for DNS.

In practice, the resolver in the UE sends a DNS query (normal arrows) to either the local name server or directly to the home network DNS server (required to be reachable from a visited domain) to retrieve selection rules for some specific domain name/service. Dashed-lines in the Figure represent iterative queries that the local name server may need to use during recursive name resolution, i.e., selection rules are retrieved from the name server whose location the UE is not aware of.

Figure 11:
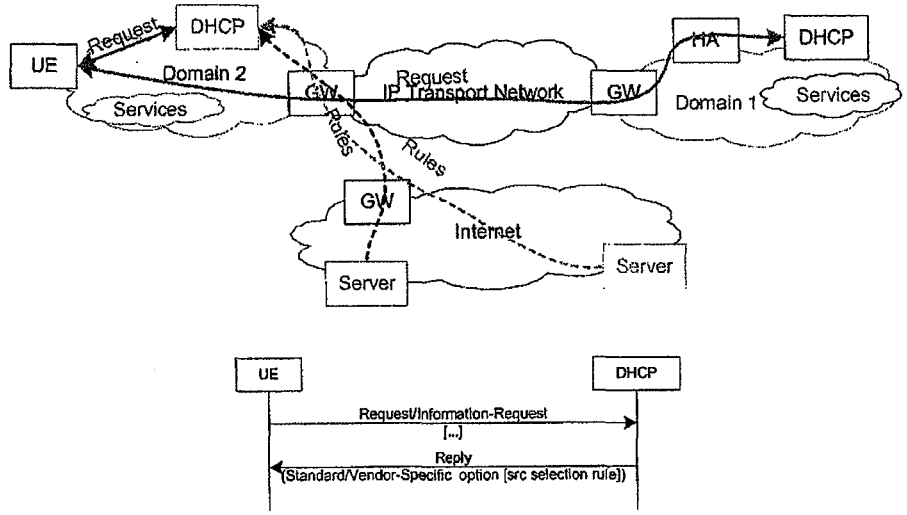
FIG. 11 shows an example illustrating how an enhanced Dynamic Host Configuration (DHCP) framework can be used to distribute selection rules.

FIG. 11 represents a DHCP (Dynamic Host Configuration Protocol) method corresponding to the DNS method discussed above. In this case selection rules are carried to nodes within DHCP Reply messages. The method may be implemented in either of two ways. In a first embodiment, the selection rules may be defined as vendor-specific information in an existing DHCP Vendor-Specific information mechanism. In an alternative embodiment, the selection rules may be included in a new DHCP mechanism dedicated specifically to providing this information.

Functionalities illustrated in FIG. 11 are specified in, for example, US20060015513. In practice, two-headed arrows in the Figure represent two possible scenarios from where in DHCP framework the UE's DHCP client may request selection rules:
1. Locally from the local DHCP server, which is the standard DHCP way to retrieve configuration parameters, such as IP or DNS addresses.
2. From the remote location, such as the home network DHCP server in the case when the UE is roaming.

Dashed-line arrows in FIG. 11 represent functionality that has been specified in US20060015513. This method enables network servers to dynamically distribute configuration parameters relating to their services to the DNS framework. This information naturally can also contain selection rule related parameters, etc . . . .

FIG. 11 represents 2 functionalities:
How selection rules are "injected" to the DHCP framework.
How this "injected" information can be retrieved to the UE.
Both functionalities are very simple and consist of basically one transaction each. MSC in the Figure illustrates "retrieving of information".

Figure 12:
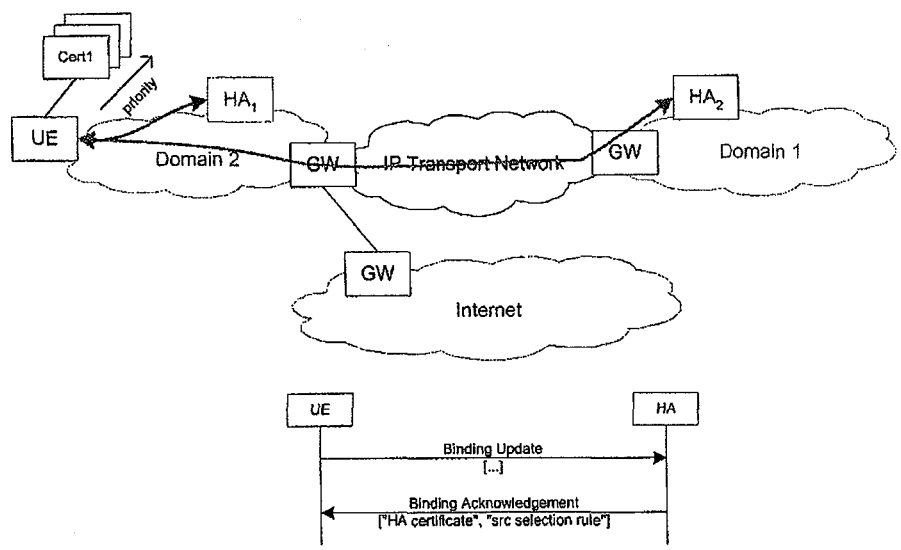
FIG. 12 shows an example illustrating how mobility management frameworks can be used to distribute selection rules.

FIG. 12 shows a third embodiment involving network to node selection rule distribution where an existing mobility management mechanism, e.g. MIPv6 binding update, is used to carry selection rules to nodes in the network. This embodiment involves modifications to MIPv6 RFC protocols because the format of the binding update message is amended to include the selection rule information.

The functionality illustrated in FIG. 12 follows the standard MIPv6 signalling and therefore no additional message exchanges are required. The new non-standard part in this embodiment is new Binding Update and Binding Acknowledgement message elements. The former can be seen as an explicit indication that a Mobile Node (MN) requests the Home Agent to provide source selection rules in a Binding Acknowledgement message. The latter is introduced to carry these source selection rules in a Binding Acknowledgement message and additionally also to carry a Home Agent certificate. When multiple Home Agents are used to distribute source selection rules that might be (partially) mutually exclusive, certificates are used to prioritize between the set of source selection rules provided by different Home Agents. It should be noted that the term "certificate" is used quite loosely here and its main purpose is to identity source selection rule authorities and is not coupled with the distributed rules, i.e., a set of source selection rules to be distributed might change without affecting a related "certificate".

Each of the selection routines may involve the use of dynamic selection rules and selection logic that are both used to determine the most appropriate source address and network access for related communication. This does not prevent the use of permanent or semi-permanent rules and logic, and in some cases these might be used as well with dynamic parts. These rules and/or logic can be located either in the terminal's local network or in the terminal. If rules are located in the network, the terminal needs to download them to be able to execute selection logic. If selection logic is located also in the network, then the terminal needs to provide sufficient parameters so that the network can execute selection logic and return results to the terminal.

Selection logic can be updated on-the-fly, for example when the syntax or semantic of rules are updated. These rules can be distributed to terminals in various ways by using either a push or a pull approach. In the push approach, a network or another terminal may initiate this information transfer sequence. In the pull method, the terminal itself initiates the transfer sequence.

Different frameworks may be involved while transferring this information to the terminal and it may occur in different phases. These frameworks can be independent of each other, but of course in this case some sort of conflict resolution is required so that a terminal is able to solve situations with contradicting rules/logic parts.

The source address selection method is dynamic in the sense that required source address and/or network access selection information is provided from the network during runtime and, if allowed, cached in the terminal or some other node in the access network. For example, this information may be provided by DNS infrastructure when the communication endpoint's symbolic name is resolved.

The required data processing functions of the mobile device may be provided by means of one or more data processors. Appropriately adapted computer program code product may be used for implementing the embodiments, when loaded to the mobile device, for example a processor of the mobile device. The program code means may, for example, perform the selection operations, generation of messages and/or information elements, interpretation of information and so forth. The program code product for providing the operation may be stored on and provided by means of a carrier medium such as a carrier disc, card or tape. A possibility is to download the program code product to the mobile device via a data network.

In one embodiment, the first and/or second selection routine may consider parameters that associate with multiradio scheduling. As mentioned above, a user equipment may be provided with multi-radio capabilities such that it may access communications services via a number of access network technologies. However, in certain circumstances it may not be possible to simultaneously operate particular access technologies, due to interference between them. Thus "multiradio scheduling" refers to the interoperability properties of multiple radio access technologies.

It is noted that whilst embodiments of the present invention have been described in relation to devices such as mobile terminals, embodiments of the present invention are applicable to any other suitable type of devices suitable for communication via a communications network.

It is also noted that the policy decision parameters discussed are only examples, and that any parameters may be employed by a hierarchical mechanism.

It is noted that even though the exemplifying embodiments shown and described in this disclosure use the terminology of the $3^{rd}$ generation (3G) WCDMA (Wideband Code Division Multiple Access) networks, such as UMTS (Universal Mobile Telecommunications System), CDMA2000 systems and wireless local area networks, embodiments of the proposed solution can be used in any communication system wherein advantage may be obtained by means of the embodiments of the invention. The selection may also be made between wireless and fixed access. The present methods may thus also be used in 3.9G or 3GPP LTE communications systems, including in embodiments where an access network provides direct "break-through" access to the internet or alternatively access to the service operator's network, or in heterogeneous and dynamic multi-address environments such as those envisaged in the EU "Ambient Networks" project.

It is also noted herein that while the above describes exemplifying embodiments of the invention, there are several variations and modifications which may be made to the disclosed solution without departing from the scope of the present invention as defined in the appended claims.

The invention claimed is:

1. A method comprising:
   executing a first selection routine in a mobile node for considering at least one first policy on access interface allocation;
   executing a second selection routine in the mobile node for considering at least one second policy on source address allocation to select a source address from two or more home addresses simultaneously in use by the mobile node, the access interface allocation and the source address allocation being for a communication between the mobile node and a network node in a communication system, wherein at least one first output of the first selection routine is inputted into the second selection routine or at least one second output of the second selection routine is inputted into the first selection routine; and
   causing a packet to be sent from the mobile node toward the network node, the packet comprising a packet source address that is the source address selected via the second selection routine;
   wherein the second selection routine considers a predefined policy on parameters that are associated with the mobile node, and wherein the second selection routine considers at least one parameter that associates with at least one of multiradio scheduling, power source, quality of service, or a type of the mobile node.

2. A method according to claim 1, wherein the first selection routine is performed and a first output obtained, and the first output is inputted into the second selection routine.

3. A method according to claim 2, wherein the second selection routine produces a second output, and a third selection routine is executed for considering at least one third policy on access interface allocation, wherein the second output is inputted into the third selection routine.

4. A method according to claim 1, wherein the two or more addresses simultaneously available to the mobile node are internet protocol (IP) addresses.

5. A method according to claim 1, wherein the second selection routine selects the source address from a home source address and a Care-of-Address source address.

6. A method according to claim 1, wherein the second selection routine selects the source address from a plurality of home source addresses associated with the mobile node.

7. A method according to claim 1, wherein the mobile node is a mobile station.

8. A method according to claim 1, wherein the first selection routine selects an access interface from a plurality of access interfaces provided by the communication system.

9. A method according to claim 1, wherein the first and/or second policy is caused to be transmitted between nodes in the communication system using a Domain Name Service.

10. A method according to claim 1, wherein information associated with the first and/or second policy is caused to be between nodes in the communication system using a Dynamic Host Configuration Protocol.

11. A method according to claim 1, wherein information associated with the first and/or second policy is caused to be between nodes in the communication system using a mobile internet protocol binding update message.

12. A method according to claim 1, wherein the mobile node is a mobile terminal.

13. A method according to claim 1, wherein the first and/or second selection routine considers parameters that associate with multiradio scheduling.

14. A method according to claim 1, further comprising causing monitoring for availability of one or more access interfaces.

15. A method according to claim 1, comprising selecting the access interface by narrowing down a list of candidate access technologies based on requirements of a service.

16. A method according to claim 1, wherein the access interface is provided by any one of a GPRS (General Packet Radio Service) network, a CDMA (Code Division Multiple Access) network, a WCDMA (Wideband Code Division Multiple Access) network, a GSM (Global System for Mobile communications) network, an EDGE (Enhanced Data rates for GSM Evolution) network, an Ultra Wide Band, a short range link and a wireless local area network.

17. A method as according to claim 1, comprising outputting from the first selection routine a list of candidate access interfaces and inputting said list into the second selection routine.

18. A method according to claim 1, comprising analysing in the first selection routine whether one or more possible communication interfaces satisfy security criteria.

19. The method of claim 1, wherein executing the first selection routine includes executing the first selection routine, the first selection routine considering at least one of connection cost, connection speed, and connection quality-of-service.

20. A mobile apparatus comprising:
at least one processor; and
at least one memory including computer program code, the at least one memory and the computer program code configured to, with the at least one processor, cause the apparatus at least to:

execute a first selection routine configured to consider at least one first policy on access interface allocation;
execute a second selection routine configured to consider at least one second policy on source address allocation to select a source address from two or more home addresses simultaneously in use by a mobile node, the access interface allocation and the source address allocation being for a communication between the mobile node and a network node in a communication system;
input at least one first output of the first selection routine into the second selection routine or input at least one second output of the second selection routine into the first selection routine, and select an access interface and the source address based on the first and second outputs; and
cause a packet to be sent from the mobile node toward the network node, the packet comprising a packet source address that is the source address selected via the second selection routine;
wherein the second selection routine considers a predefined policy on parameters that are associated with the mobile node, and wherein the second selection routine considers at least one parameter that associates with at least one of multiradio scheduling, power source, quality of service, or a type of the mobile node.

21. An apparatus according to claim 20, wherein the apparatus is a mobile terminal.

22. An apparatus according to claims 20, wherein the first selection routine is performed and a first output obtained, and the first output is inputted into the second selection routine.

23. An apparatus according to claim 22, wherein the second selection routine produces a second output, and a third selection routine is executed for considering at least one third policy on access interface allocation, wherein the second output is inputted into the third selection routine.

24. An apparatus according to claims 20, wherein the two or more addresses simultaneously available to the mobile node are internet protocol (IP) addresses.

25. An apparatus according to claims 20, wherein the second selection routine selects the source address from a home source address and a Care-of-Address source address.

26. An apparatus according to claims 20, wherein the second selection routine selects the source address from a plurality of home source addresses associated with the communication device.

27. An apparatus according to claims 20, wherein the first selection routine selects an access interface from a plurality of access interfaces provided by the communication system.

28. An apparatus according to claims 20, wherein at least one of the first or second policy is caused to be transmitted between nodes in the communication system using a Domain Name Service.

29. An apparatus according to claims 20, wherein information associated with at least one of the first or second policy is caused to be transmitted between nodes in the communication system using a Dynamic Host Configuration Protocol.

30. An apparatus according to claims 20, wherein information associated with the first and/or second policy is caused to be transmitted between nodes in the communication system using a mobile internet protocol binding update message.

31. The apparatus of claim 20, wherein the apparatus caused to execute the first selection routine includes being caused to execute the first selection routine, the first selection routine considering at least one of connection cost, connection speed, and connection quality-of-service.

32. An apparatus comprising:
at least one processor; and
at least one memory including computer program code, the at least one memory and the computer program code configured to, with the at least one processor, cause the apparatus at least to:
  execute a first selection routine configured to consider at least one first policy on access interface allocation;
  execute a second selection routine configured to consider at least one second policy on source address allocation to select a source address from two or more addresses simultaneously in use by a mobile node, the access interface allocation and the source address allocation being for a communication between the mobile node and a network node in a communication system, wherein the second selection is based at least in part on at least one selection rule received using a dynamic host configuration protocol;
  input at least one first output of the first selection routine into the second selection routine or to input at least one second output of the second selection routine into the first selection routine; and
  cause a packet to be sent from the mobile node toward the network node, the packet comprising a packet source address that is the source address selected via the second selection routine;
  wherein the second selection routine considers a predefined policy on parameters that are associated with the mobile node, and wherein the second selection routine considers at least one parameter that associates with at least one of multiradio scheduling, power source, quality of service, or a type of the mobile node.

33. An apparatus according to claim 32, wherein the apparatus is caused to input the at least one first output into the second selection routine.

34. An apparatus according to claim 32, wherein the apparatus is caused to execute a third selection routine for considering at least one third policy on access interface allocation, wherein the at least one second output is inputted into the third selection routine.

35. An apparatus according to claim 32, wherein the two or more addresses simultaneously available to the mobile node are internet protocol (IP) addresses.

36. An apparatus according to claim 32, wherein the apparatus is caused to execute the second selection routine to selects the source address from a home source address or a Care-of-Address source address.

37. An apparatus according to claim 32, wherein the apparatus is caused to execute the second selection routine to select the source address from a plurality of home source addresses associated with the mobile node.

38. The apparatus of claim 32, wherein the apparatus caused to execute the first selection routine includes being caused to execute the first selection routine, the first selection routine considering at least one of connection cost, connection speed, and connection quality-of-service.

39. A system comprising:
a mobile node, and
a network node,
wherein the mobile node comprises at least one processor and at least one memory including computer program code, the at least one memory and the computer program code configured to, with the at least one processor, cause the mobile node at least to:
  execute a first selection routine configured to consider at least one first policy on access interface allocation;
  execute a second selection routine configured to consider at least one second policy on source address allocation to select a source address from two or more home addresses simultaneously in use by the mobile node, wherein at least one first output of the first selection routine is an input into the second selection routine or at least one second output of the second selection routine is an input into the first selection routine; and
  cause a packet to be sent from the mobile node toward the network node, the packet comprising a packet source address that is the source address selected via the second selection routine
  wherein the second selection routine considers a predefined policy on parameters that associate with the mobile node, and wherein the second selection routine considers at least one parameter that is associated with at least one of multiradio scheduling, power source, quality of service, or a type of the mobile node.

40. The system of claim 39, wherein the mobile node caused to execute the first selection routine includes being caused to execute the first selection routine, the first selection routine considering at least one of connection cost, connection speed, and connection quality-of-service.

41. A non-transitory computer readable storage medium having program code stored thereon, the program code being configured to, when executed by a processor, cause an apparatus to perform at least:
  executing a first selection routine for considering at least one first policy on access interface allocation;
  executing a second selection routine for considering at least one second policy on source address allocation to select a source address from two or more home addresses simultaneously in use by the mobile node, the access interface allocation and the source address allocation being for a communication between a mobile node and a network node in a communication system, wherein at least one first output of the first selection routine is inputted into the second selection routine or at least one second output of the second selection routine is inputted into the first selection routine; and
  cause a packet to be sent from the mobile node toward the network node, the packet comprising a packet source address that is the source address selected via the second selection routine;
  wherein the second selection routine considers a predefined policy on parameters that are associated with the mobile node, and wherein the second selection routine considers at least one parameter that associates with at least one of multiradio scheduling, power source, quality of service, or a type of the mobile node.

42. A non-transitory computer readable storage medium according to claim 41, wherein the method that the program code is configured to perform includes inputting the at least one first output into the second selection routine.

43. A non-transitory computer readable storage medium according to claim 41, wherein the method that the program code is configured to perform includes executing a third selection routine for considering at least one third policy on access interface allocation, wherein the at least one second output is inputted into the third selection routine.

44. The non-transitory computer readable storage medium of claim 41, wherein the program code configured to cause the apparatus to perform executing the first selection routine includes being configured to cause the apparatus to perform executing the first selection routine, the first selection routine considering at least one of connection cost, connection speed, and connection quality-of-service.

\* \* \* \* \*